(12) United States Patent
Anegawa et al.

(10) Patent No.: US 11,559,952 B2
(45) Date of Patent: Jan. 24, 2023

(54) THREE-DIMENSIONAL SHAPING SYSTEM AND THREE-DIMENSIONAL SHAPED OBJECT MANUFACTURING METHOD

(71) Applicant: SEIKO EPSON CORPORATION, Tokyo (JP)

(72) Inventors: Kenta Anegawa, Matsumoto (JP); Daizo Aoyagi, Shiojiri (JP); Yusuke Watanabe, Shiojiri (JP); Kanji Okuyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/183,800

(22) Filed: Feb. 24, 2021

(65) Prior Publication Data

US 2021/0260836 A1   Aug. 26, 2021

(30) Foreign Application Priority Data

Feb. 26, 2020  (JP) .............................. JP2020-030178

(51) Int. Cl.
| | |
|---|---|
| *B33Y 40/20* | (2020.01) |
| *B29C 69/00* | (2006.01) |
| *B29C 64/245* | (2017.01) |
| *B29C 64/153* | (2017.01) |
| *B29C 64/393* | (2017.01) |
| *B33Y 30/00* | (2015.01) |
| *B33Y 50/02* | (2015.01) |
| *B29C 64/379* | (2017.01) |
| *B33Y 10/00* | (2015.01) |

(52) U.S. Cl.
CPC .......... *B29C 69/001* (2013.01); *B29C 64/153* (2017.08); *B29C 64/245* (2017.08); *B29C 64/379* (2017.08); *B29C 64/393* (2017.08); *B33Y 30/00* (2014.12); *B33Y 40/20* (2020.01); *B33Y 50/02* (2014.12); *B33Y 10/00* (2014.12)

(58) Field of Classification Search
None
See application file for complete search history.

(56) References Cited

U.S. PATENT DOCUMENTS

2010/0112225 A1* 5/2010 Sato .................... H01L 21/6776
                                                          118/58

FOREIGN PATENT DOCUMENTS

| EP | 3482911 | 5/2019 | |
|---|---|---|---|
| EP | 3482911 A1 * | 5/2019 | .............. B22F 10/20 |

(Continued)

*Primary Examiner* — Alexander M Weddle
(74) *Attorney, Agent, or Firm* — Workman Nydegger

(57) ABSTRACT

A three-dimensional shaping system includes a first table provided with a first positioning mechanism, a first shaping machine configured to shape a first shaped object on the first table, a first cutting machine provided with a first mounting portion having a second positioning mechanism and configured to cut the first shaped object, a conveying machine configured to convey the first table between the first shaping machine and the first cutting machine, and a control unit configured to control the first shaping machine, the first cutting machine, and the conveying machine. The control unit controls the first shaping machine to shape the first shaped object, controls the conveying machine to convey the first table from the first shaping machine to the first cutting machine so that the first and second positioning mechanisms engage with each other, and controls the first cutting machine to cut the first shaped object.

8 Claims, 9 Drawing Sheets

(56) References Cited

FOREIGN PATENT DOCUMENTS

| JP | 2018-012336 A | | 1/2018 |
|----|---------------|---|--------|
| JP | 2018-024176 A | | 2/2018 |
| JP | 2019-031011 A | | 2/2019 |
| JP | 2019031011 A | * | 2/2019 |

* cited by examiner

THREE-DIMENSIONAL SHAPING SYSTEM AND THREE-DIMENSIONAL SHAPED OBJECT MANUFACTURING METHOD

The present application is based on, and claims priority from JP Application Serial Number 2020-030178, filed Feb. 26, 2020, the disclosure of which is hereby incorporated by reference herein in its entirety.

BACKGROUND

1. Technical Field

The present disclosure relates to a three-dimensional shaping system and a three-dimensional shaped object manufacturing method.

2. Related Art

There is a three-dimensional shaping apparatus that shapes a three-dimensional shaped object by disposing a material having flowability at a desired position.

For example, JP-A-2019-31011 discloses a molded product manufacturing apparatus. The molded product manufacturing apparatus includes a molding machine that molds a molded product by a fused deposition modeling method, a cutting machine that cuts and processes the molded product molded by the molding machine, and a transfer machine that transfers a table between the molding machine and the cutting machine. After the molded product is formed by the molding machine, the transfer machine places the molded product on the table below a carriage of the cutting machine.

In the molded product manufacturing apparatus, when the transfer machine cannot dispose the table at a predetermined position of the cutting machine, the molded product on the table cannot be accurately cut. When the molded product cannot be accurately cut, quality of the molded product deteriorates.

SUMMARY

A three-dimensional shaping system according to an aspect of the present disclosure includes a first table provided with a first positioning mechanism, a first shaping machine configured to shape a first shaped object on the first table, a first cutting machine provided with a first mounting portion having a second positioning mechanism and configured to cut the first shaped object on the first table, a conveying machine configured to convey the first table between the first shaping machine and the first cutting machine, and a control unit configured to control the first shaping machine, the first cutting machine, and the conveying machine. The control unit is configured to control the first shaping machine to execute a first shaping processing of shaping the first shaped object, control the conveying machine to execute a conveying processing of conveying the first table from the first shaping machine to the first cutting machine so that the first positioning mechanism and the second positioning mechanism engage with each other, and control the first cutting machine to execute a first cutting processing of cutting the first shaped object.

A three-dimensional shaped object manufacturing method according to another aspect of the present disclosure includes shaping a shaped object on a table provided with a first positioning mechanism by a shaping machine, conveying the table from the shaping machine to a cutting machine provided with a mounting portion having a second positioning mechanism so that the first positioning mechanism and the second positioning mechanism engage with each other, and cutting the shaped object on the conveyed table by the cutting machine.

DESCRIPTION OF EXEMPLARY EMBODIMENTS

Hereinafter, preferred embodiments of the present disclosure will be described in detail with reference to drawings. The embodiments to be described below do not in any way limit contents of the present disclosure described in the appended claims. Not all configurations to be described below are necessarily essential components of the present disclosure.

1. THREE-DIMENSIONAL SHAPING SYSTEM

1.1. Configuration

Figure 1:
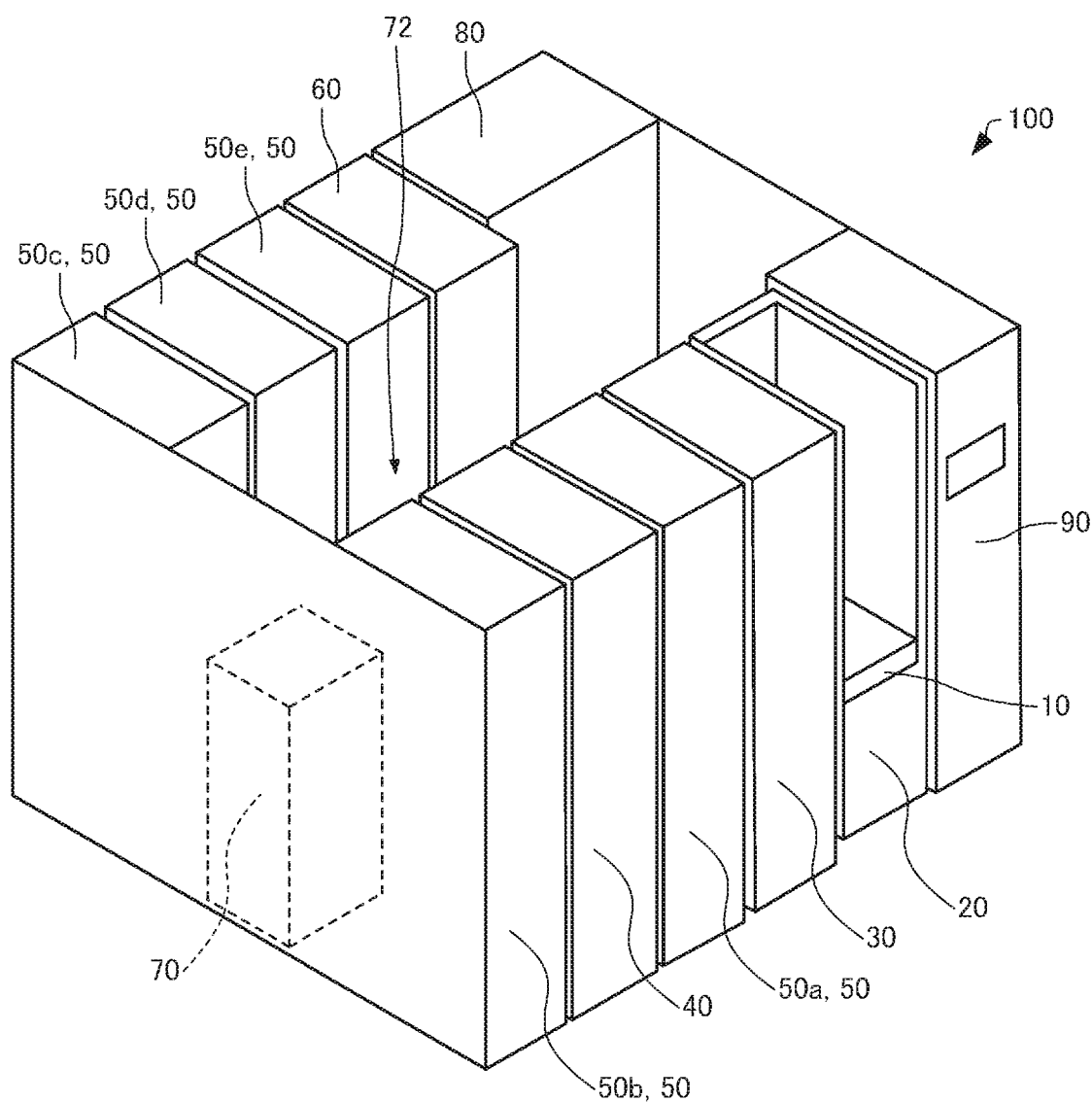
FIG. 1 is a perspective view schematically showing a three-dimensional shaping system according to the present embodiment.
Figure 2:
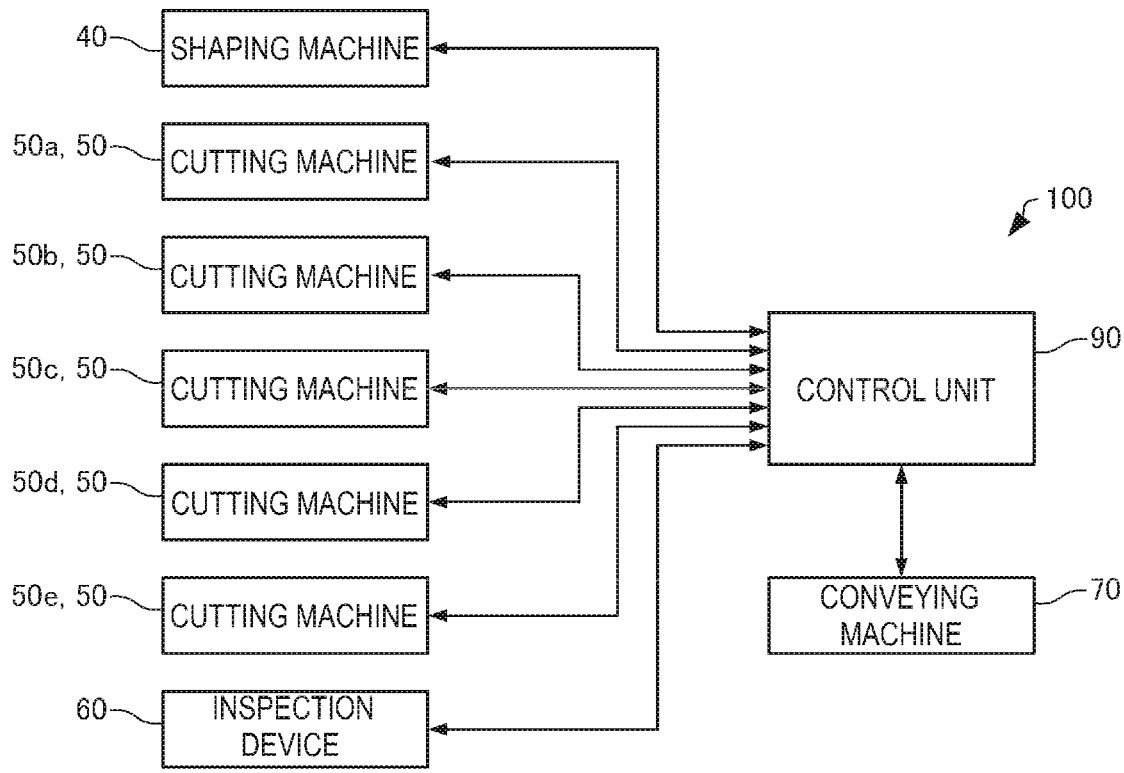
FIG. 2 is a functional block diagram of the three-dimensional shaping system according to the present embodiment.

First, a three-dimensional shaping system according to the present embodiment will be described with reference to the drawings. FIG. 1 is a perspective view schematically showing a three-dimensional shaping system 100 according to the present embodiment. FIG. 2 is a functional block diagram of the three-dimensional shaping system 100 according to the present embodiment.

As shown in FIGS. 1 and 2, the three-dimensional shaping system 100 includes, for example, a table 10, a placement portion 20, a stocker portion 30, a shaping machine 40, a cutting machine 50, an inspection device 60, a conveying machine 70, a dust collecting unit 80, and a control unit 90. Hereinafter, these units will be described in order.

1.1.1. Table

Figure 3:
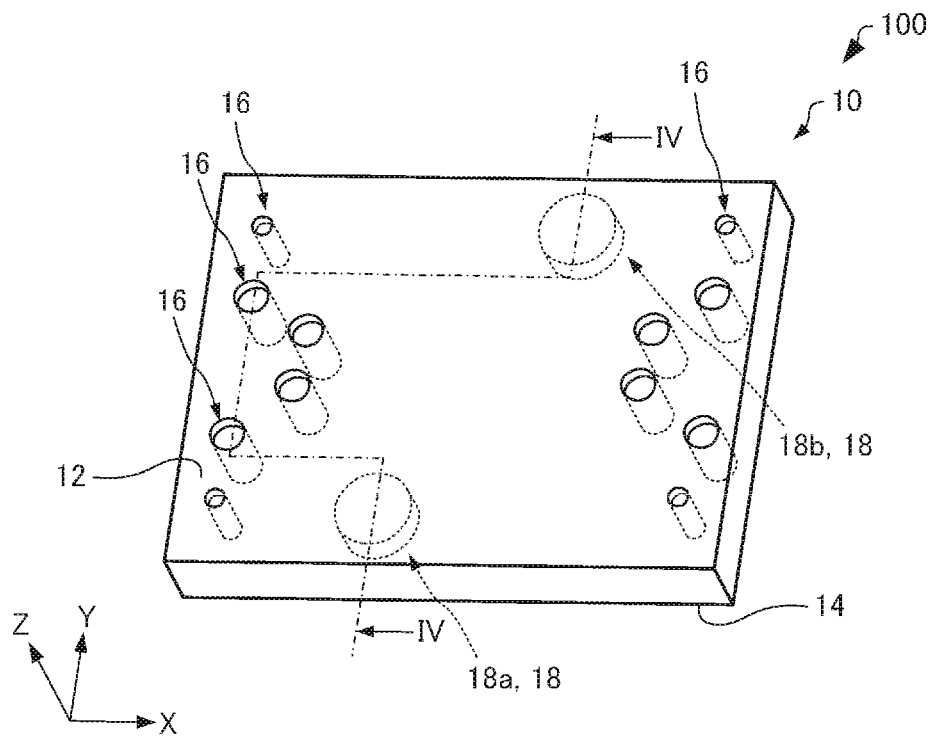
FIG. 3 is a perspective view schematically showing a table of the three-dimensional shaping system according to the present embodiment.
Figure 4:
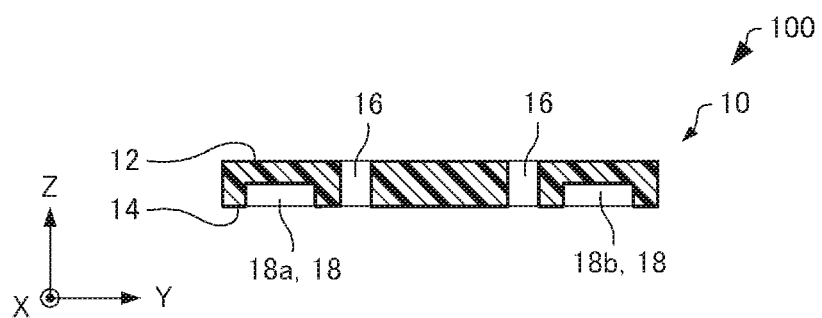
FIG. 4 is a cross-sectional view schematically showing the table of the three-dimensional shaping system according to the present embodiment.

A shaping material is discharged from the shaping machine 40 to the table 10. The table 10 is a portion for supporting a shaped object manufactured by the three-dimensional shaping system 100. FIG. 3 is a perspective view schematically showing the table 10. FIG. 4 is a cross-sectional view taken along line IV-IV in FIG. 3 and schematically showing the table 10. FIGS. 3 and 4 show an X axis, a Y axis, and a Z axis serving as three axes orthogonal to one another.

As shown in FIGS. 3 and 4, the table 10 has a first surface 12 and a second surface 14. The first surface 12 is a surface onto which the shaping material is discharged from the shaping machine 40. The second surface 14 is a surface opposite to the first surface 12.

The table 10 is provided with an opening 16. For example, a plurality of openings 16 are provided. In the example shown in the figures, the opening 16 penetrates though the table 10 from the first surface 12 to the second surface 14. Although not shown, the opening 16 may not reach the second surface 14, and may be a bottomed recess portion provided on the first surface 12. When a shaped object is shaped by the shaping machine 40, the shaping material is embedded in the opening 16. Accordingly, the shaped object exhibits an anchor effect, and when the shaped object is cut by the cutting machine 50, the shaped object can be prevented from being separated from the table 10. Further, it is possible to reduce warpage of the table 10 caused by being cooled after the shaping executed by the shaping machine 40.

The table 10 is provided with a positioning mechanism 18. The positioning mechanism 18 determines a position of the table 10 with respect to a mounting portion 170 of the shaping machine 40 when the table 10 is mounted on the mounting portion 170. Further, the positioning mechanism 18 determines a position of the table 10 with respect to a mounting portion 53 of the cutting machine 50 when the table 10 is mounted on the mounting portion 53. In the example shown in the figures, the positioning mechanism 18 is a recessed portion provided on the second surface 14. For example, a plurality of positioning mechanisms 18 are provided. In the example shown in the figures, two positioning mechanisms 18 (positioning mechanisms 18a and 18b) are provided.

Figure 5:
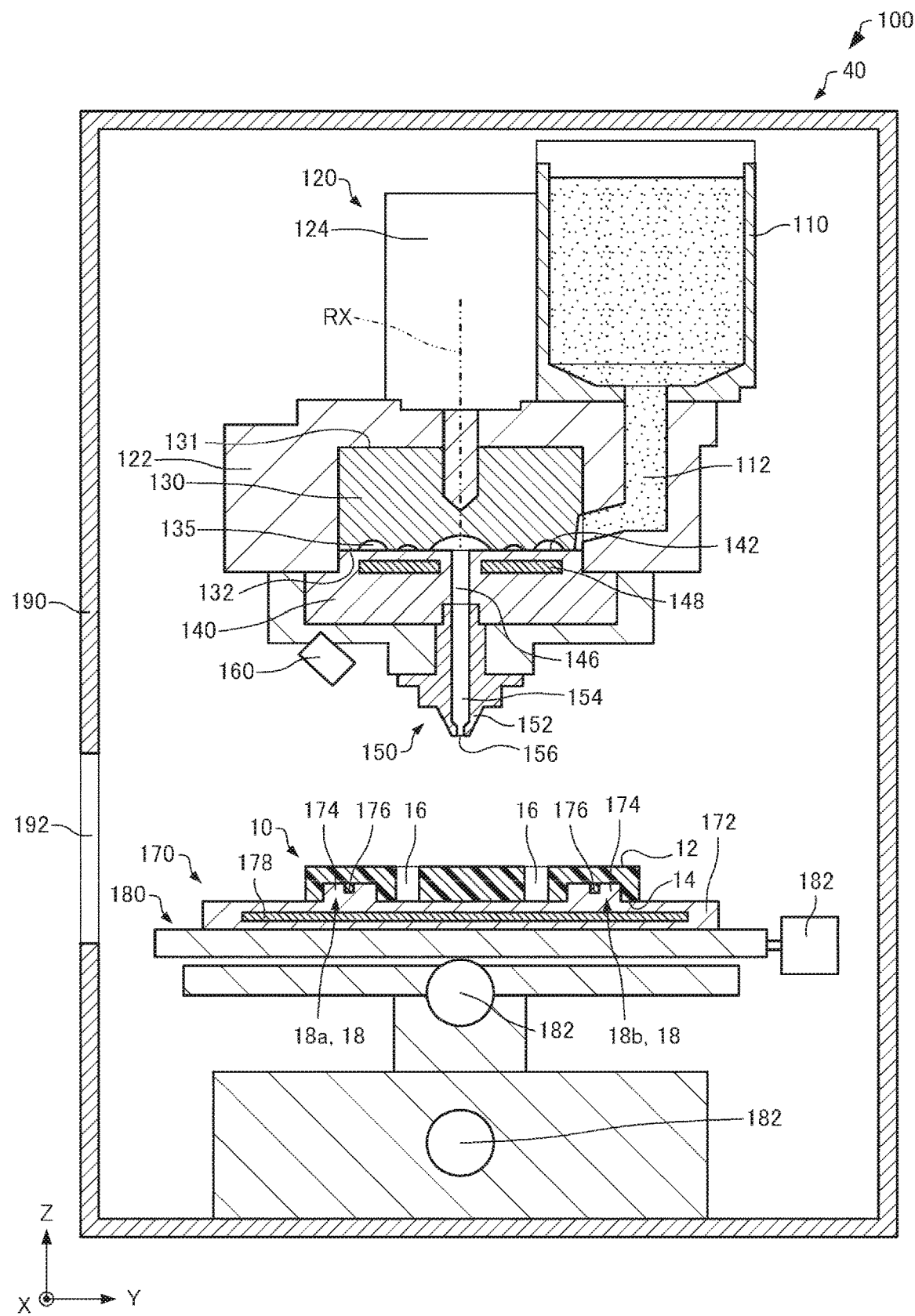
FIG. 5 is a cross-sectional view schematically showing a shaping machine of the three-dimensional shaping system according to the present embodiment.

A material of the table 10 is, for example, a resin, and is preferably an epoxy glass. When the material of the table 10 is an epoxy glass, the table 10 can be fused to the mounting portion 170 by heat of a heating unit 178 of the shaping machine 40 as shown in FIG. 5 to be described later.

1.1.2. Placement Portion

As shown in FIG. 1, the placement portion 20 is a portion where the table 10 is placed. A user places the table 10 in the placement portion 20.

1.1.3. Stocker Portion

The stocker portion 30 is a portion for temporarily storing the table 10 that was placed. The table 10 that was placed is conveyed from the placement portion 20 to the stocker portion 30 by the conveying machine 70.

1.1.4. Shaping Machine

The shaping machine 40 shapes a shaped object on the table 10. The table 10 stored in the stocker portion 30 is conveyed from the stocker portion 30 to the shaping machine 40 by the conveying machine 70. FIG. 5 is a cross-sectional view schematically showing the shaping machine 40.

As shown in FIG. 5, the shaping machine 40 includes, for example, a material supply unit 110, a melting unit 120, a discharge unit 150, a re-heating unit 160, the mounting portion 170, a moving mechanism 180, and a housing 190.

A material in a pellet form or a powder form is charged into the material supply unit 110. Examples of the material in a pellet form include acrylonitrile butadiene styrene (ABS). The material supply unit 110 is implemented by, for example, a hopper. The material supply unit 110 and the melting unit 120 are coupled by a supply path 112 provided below the material supply unit 110. The material charged into the material supply unit 110 is supplied to the melting unit 120 via the supply path 112.

The melting unit 120 includes, for example, a screw case 122, a drive motor 124, a flat screw 130, and a barrel 140. The melting unit 120 melts a solid-state material supplied from the material supply unit 110 to form a paste shaping material having flowability, and supplies the paste shaping material to a nozzle 152.

The screw case 122 accommodates the flat screw 130. The drive motor 124 is fixed to an upper surface of the screw case 122.

The flat screw 130 has a substantially cylindrical shape whose height in a central axis RX direction is smaller than a diameter. In the example shown in the figures, the flat screw 130 is disposed in the screw case 122 such that the central axis RX is parallel to the Z axis. The flat screw 130 is rotated around the central axis RX by a torque generated by the drive motor 124.

Figure 6:
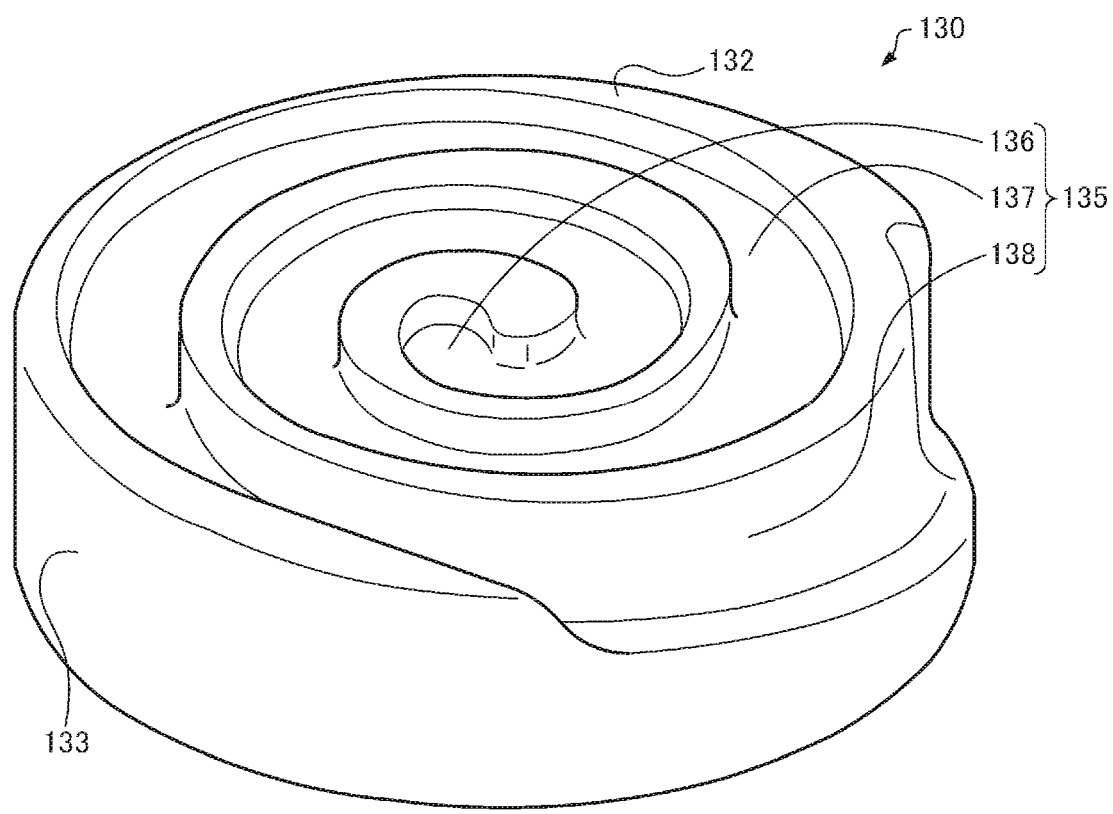
FIG. 6 is a perspective view schematically showing a flat screw of a three-dimensional shaping apparatus according to the present embodiment.
Figure 6:
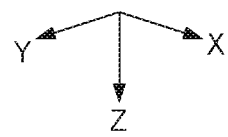

The flat screw 130 has a groove forming surface 132 at an opposite side to an upper surface 131. The groove forming surface 132 is provided with a groove portion 135. FIG. 6 is a perspective view schematically showing the flat screw 130. For the sake of convenience, FIG. 6 shows a state in which an up-down positional relationship is reversed from a state shown in FIG. 5.

As shown in FIG. 6, the groove portion 135 of the flat screw 130 includes, for example, a central portion 136, a vortex portion 137, and a material introduction portion 138.

The central portion 136 is a circular depression formed around the central axis RX of the flat screw 130. The central portion 136 faces a communication hole 146 provided in the barrel 140.

The vortex portion 137 is a groove extending in a vortex manner around the central portion 136 so as to draw arcs toward an outer periphery of the groove forming surface 132. The vortex portion 137 may extend in an involute curve manner or a spiral manner. One end of the vortex portion 137 is coupled to the central portion 136. The other end of the vortex portion 137 is coupled to the material introduction portion 138.

The material introduction portion 138 is a groove wider than the vortex portion 137 provided at an outer peripheral edge of the groove forming surface 132. The material introduction portion 138 is continuous up to a side surface 133 of the flat screw 130. The material introduction portion 138 introduces the material supplied from the material supply unit 110 via the supply path 112 into the vortex portion 137.

Although one vortex portion 137 and one material introduction portion 138 are provided from the central portion 136 toward an outer periphery in the example shown in FIG. 6, a plurality of vortex portions 137 and a plurality of material introduction portions 138 may be provided from the central portion 136 toward the outer periphery.

As shown in FIG. 5, the barrel 140 is provided below the flat screw 130. The barrel 140 has a screw facing surface 142 that faces the groove forming surface 132 of the flat screw 130. A heater 148 is built in the barrel 140. A temperature of the heater 148 is controlled by the control unit 90. A position of the heater 148 is not particularly limited as long as the shaping material can be heated. The heater 148 may be built in the flat screw 130, or may be provided outside the flat screw 130 and the barrel 140.

Figure 7:
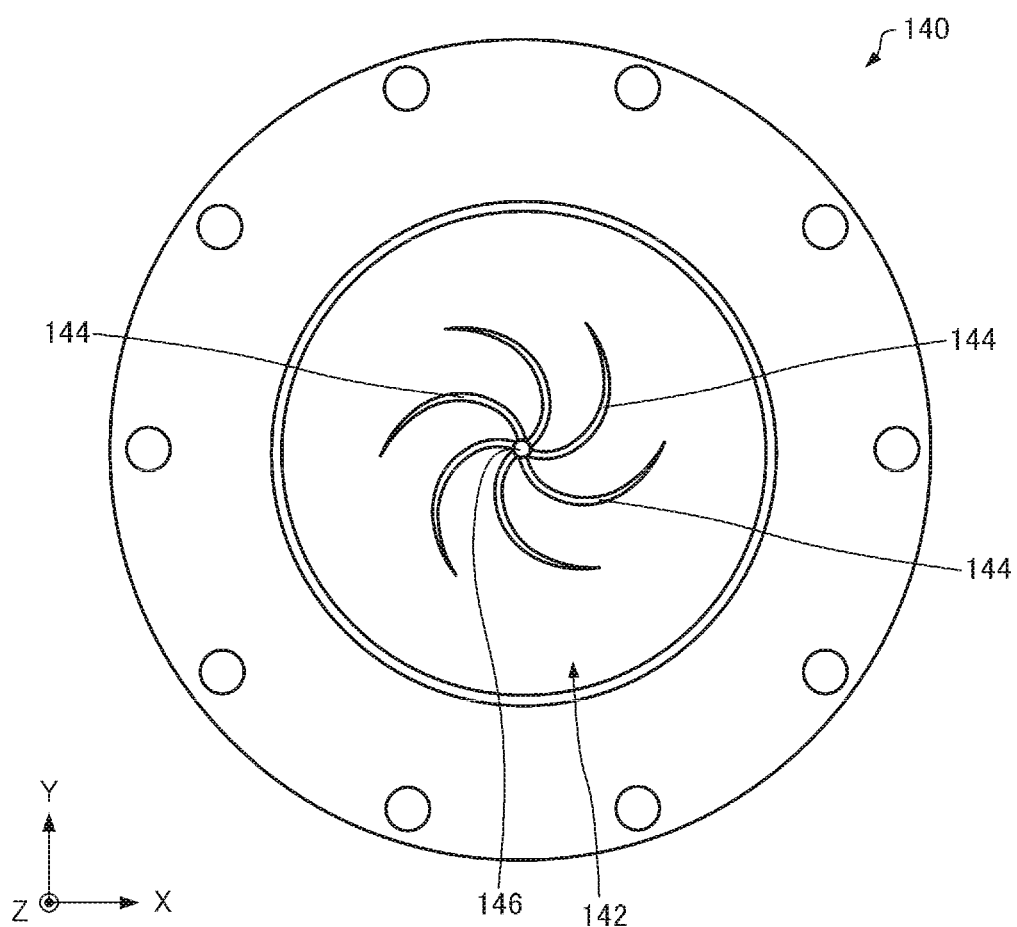
FIG. 7 is a plan view schematically showing a barrel of the three-dimensional shaping apparatus according to the present embodiment.

The communication hole 146 is provided at the center of the screw facing surface 142 of the barrel 140. The communication hole 146 communicates with a nozzle flow path 154. FIG. 7 is a plan view schematically showing the barrel 140.

As shown in FIG. 7, a guide groove 144 and the communication hole 146 are provided on the screw facing surface 142 of the barrel 140. A plurality of guide grooves 144 are provided. The plurality of guide grooves 144 are provided around the communication hole 146 when viewed from a Z axis direction. One end of the guide groove 144 is coupled to the communication hole 146 and the guide grooves 144 extend in a vortex manner from the communication hole 146 toward an outer periphery of the screw facing surface 142. The guide groove 144 has a function of guiding the shaping material to the communication hole 146. The guide groove 144 may not be provided.

As shown in FIG. 5, the discharge unit 150 includes the nozzle 152. The nozzle 152 is provided with the nozzle flow path 154 and a nozzle hole 156. The nozzle flow path 154 communicates with the communication hole 146 of the melting unit 120. The nozzle hole 156 communicates with the nozzle flow path 154. The nozzle hole 156 is an opening provided at a tip end portion of the nozzle 152. For example, a planar shape of the nozzle hole 156 is a circle. The shaping material supplied from the melting unit 120 to the nozzle 152 is discharged from the nozzle hole 156.

The re-heating unit 160 re-heats a cured shaped object that was shaped on the table 10. The re-heating unit 160 is, for example, a heater provided in the vicinity of the nozzle 152. A temperature of the re-heating unit 160 is controlled by the control unit 90.

Figure 8:
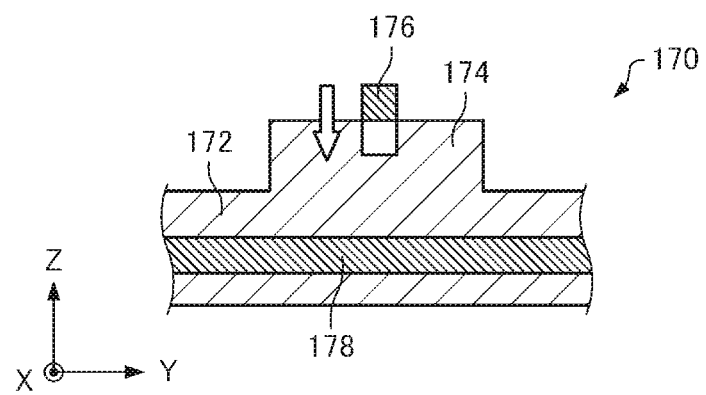
FIG. 8 is a cross-sectional view schematically showing a mounting portion of the shaping machine of the three-dimensional shaping system according to the present embodiment.

The table 10 is mounted on the mounting portion 170. FIG. 8 is a cross-sectional view schematically showing the mounting portion 170. As shown in FIGS. 5 and 8, the mounting portion 170 includes a base portion 172, a positioning mechanism 174, a movable portion 176, and the heating unit 178.

The base portion 172 has, for example, a plate shape. The positioning mechanism 174 engages with the positioning mechanism 18 of the table 10. In the example shown in the figures, the positioning mechanism 174 is a protrusion portion protruding upward from the base portion 172. For example, a plurality of positioning mechanisms 174 are provided. In the example shown in FIG. 5, two positioning mechanisms 174 are provided.

The movable portion 176 is provided at the positioning mechanism 174. The movable portion 176 moves along the Z axis. As shown in FIG. 8, when the table 10 is not mounted on the mounting portion 170, the movable portion 176 protrudes upward from the positioning mechanism 174. When the table 10 is not mounted on the mounting portion 170, the movable portion 176 may protrude upward from the positioning mechanism 174 by a force of a spring. As shown in FIG. 5, when the table 10 is mounted on the mounting portion 170 and the positioning mechanism 174 and the positioning mechanism 18 engage with each other, the movable portion 176 moves to an opening provided in the positioning mechanism 174.

The heating unit 178 is built in, for example, the base portion 172. The heating unit 178 is driven when the positioning mechanism 18 and the positioning mechanism 174 engage with each other. Specifically, the heating unit 178 is a mechanism that automatically starts driving when the positioning mechanism 18 and the positioning mechanism 174 engage with each other and the movable portion 176 moves downward. The heating unit 178 is a mechanism that automatically stops the driving when the positioning mechanism 18 and the positioning mechanism 174 disengaged from each other and the movable portion 176 moves upward. The heating unit 178 heats the shaping material discharged onto the table 10. The heating unit 178 is, for example, a heater.

Although not shown, the heating unit 178 may not be built in the base portion 172. For example, an electric heating wire serving as the heating unit 178 may be built in the table 10, and when the table 10 is mounted on the base portion 172, the electric heating wire is driven by energizing the electric heating wire.

The moving mechanism 180 supports the mounting portion 170. The moving mechanism 180 changes a relative position between the nozzle 152 and the mounting portion 170. In the example shown in the figures, the moving mechanism 180 moves the mounting portion 170 with respect to the nozzle 152. The moving mechanism 180 is implemented by, for example, a three-axis positioner that moves the mounting portion 170 in an X axis direction, a Y axis direction, and the Z axis direction by drive forces of three motors 182. The motors 182 are driven under the control of the control unit 90.

The moving mechanism 180 may be configured to move the nozzle 152 without moving the mounting portion 170. Alternatively, the moving mechanism 180 may be configured to move both the nozzle 152 and the mounting portion 170.

The three-dimensional shaping system 100 drives the moving mechanism 180 to change a relative position between the nozzle 152 and the mounting portion 170 while discharging the shaping material from the nozzle 152 to the table 10 on the mounting portion 170. Accordingly, the shaping machine 40 discharges the shaping material on the table 10 to shape a shaped object.

The housing 190 accommodates the material supply unit 110, the melting unit 120, the discharge unit 150, the re-heating unit 160, the mounting portion 170, and the moving mechanism 180. The housing 190 is provided with an opening 192. The conveying machine 70 moves the table 10 into and out of the housing 190 through the opening 192.

1.1.5. Cutting Machine

Figure 9:
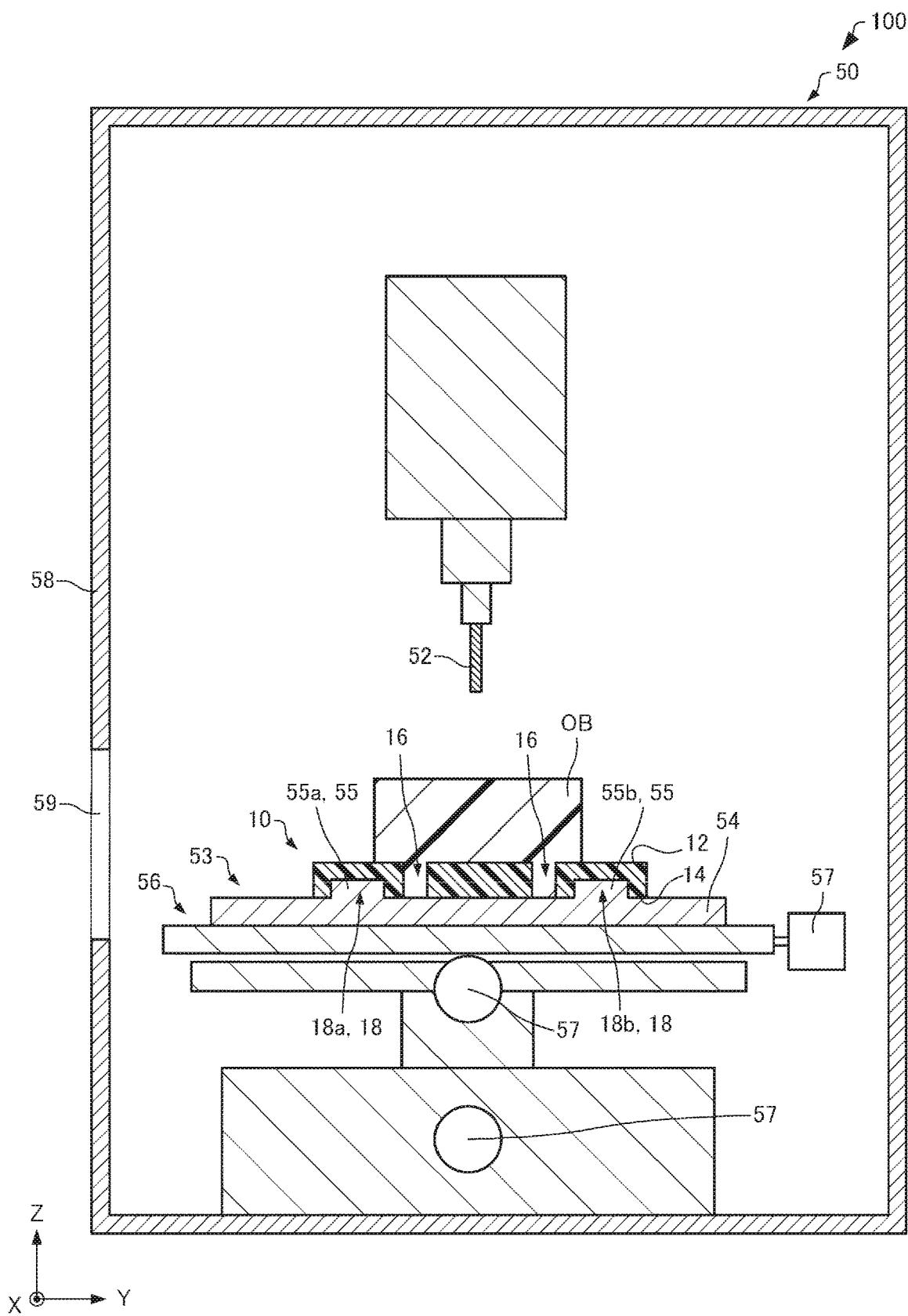
FIG. 9 is a cross-sectional view schematically showing a cutting machine of the three-dimensional shaping system according to the present embodiment.

The cutting machine 50 cuts the shaped object on the table 10. The table 10 on which the shaped object is placed is conveyed from the shaping machine 40 to the cutting machine 50 by the conveying machine 70. FIG. 9 is a cross-sectional view schematically showing the cutting machine 50.

As shown in FIG. 9, the cutting machine 50 includes a cutting tool 52, the mounting portion 53, a moving mechanism 56, and a housing 58. Although not shown, the cutting machine 50 may include a static eliminator such as an ionizer.

The cutting tool 52 is, for example, a rod-shaped member extending in the Z axis direction. The cutting machine 50 cuts a shaped object OB on the table 10 by rotating the cutting tool 52 around a rotation axis parallel to the Z axis. Examples of the cutting tool 52 include a flat end mill, a ball end mill, and the like. For example, the cutting machine 50 detects a position of a tip end of the cutting tool 52 by a position detection sensor, and transmits the detection result to the control unit 90. The control unit 90 uses the detection result from the cutting machine 50 to control a relative positional relationship between the cutting tool 52 and the mounting portion 53 and execute cutting.

The table 10 is mounted on the mounting portion 53. The mounting portion 53 includes a base portion 54 and a positioning mechanism 55. The base portion 54 has, for example, a plate shape. The positioning mechanism 55 engages with the positioning mechanism 18 of the table 10. In the example shown in the figures, the positioning mechanism 55 is a protrusion portion protruding upward from the base portion 54. For example, a plurality of positioning mechanisms 55 are provided. In the example shown in the figure, two positioning mechanisms 55 (positioning mechanisms 55a and 55b) are provided. In the example shown in the figure, the positioning mechanism. 18a and the positioning mechanism 55a engage with each other, and the positioning mechanism 18b and the positioning mechanism 55b engage with each other.

Although not shown, the positioning mechanism 55 of the cutting machine 50 may be a recessed portion, and the positioning mechanism 18 of the table 10 may be a protrusion portion. Similarly, the positioning mechanism 174 of the shaping machine 40 may be a recessed portion, and the positioning mechanism 18 of the table 10 may be a protrusion portion. In this manner, a shape of the positioning mechanisms 18, 55, 174 is not particularly limited.

The moving mechanism 56 supports the mounting portion 53. The moving mechanism 56 changes a relative position between the cutting tool 52 and the mounting portion 53. In the example shown in the figure, the moving mechanism 56 moves the mounting portion 53 with respect to the cutting tool 52. The moving mechanism 56 is implemented by, for example, a three-axis positioner that moves the mounting portion 53 in the X axis direction, the Y axis direction, and the Z axis direction by drive forces of three motors 57. The motors 57 are driven under the control of the control unit 90.

The moving mechanism 56 may be configured to move the cutting tool 52 without moving the mounting portion 53. Alternatively, the moving mechanism 56 may be configured to move both the cutting tool 52 and the mounting portion 53.

The three-dimensional shaping system 100 drives the moving mechanism 56 to change a relative position between the cutting tool 52 and the mounting portion 53 while rotating the cutting tool 52. Accordingly, the cutting machine 50 cuts the shaped object OB shaped on the table 10.

The housing 58 accommodates the cutting tool 52, the mounting portion 53, and the moving mechanism 56. The housing 58 is provided with an opening 59. The conveying machine 70 moves the table 10 into and out of the housing 58 through the opening 59.

For example, a plurality of cutting machines 50 are provided. In the example shown in FIG. 1, five cutting machines 50 (a first cutting machine 50a, a second cutting machine 50b, a third cutting machine 50c, a fourth cutting machine 50d, and a fifth cutting machine 50e) are provided.

1.1.6. Inspection Device

The inspection device 60 inspects the shaped object OB cut by the cutting machine 50. The table 10 on which the shaped object OB that was cut is placed is conveyed from the cutting machine 50 to the inspection device 60 by the conveying machine 70.

The inspection device 60 is a three-dimensional measuring device. The inspection device 60, for example, images the shaped object OB that was cut with a camera, and generates standard triangulated language (STL) data based on an image of the shaped object OB that was imaged. Then, the inspection device 60 compares the generated STL data with computer-aided design (CAD) data serving as a design drawing of the shaped object OB, and transmits an inspection result to the control unit 90. For example, the CAD data is created using three-dimensional CAD software according to an instruction from the user.

1.1.7. Conveying Machine

The conveying machine 70 conveys the table 10 based on a signal from the control unit 90. The conveying machine 70 conveys the table 10 between the placement portion 20 and the stocker portion 30. The conveying machine 70 conveys the table 10 between the stocker portion 30 and the shaping machine 40. The conveying machine 70 conveys the table 10 between the shaping machine 40 and the cutting machine 50. The conveying machine 70 conveys the table 10 between the cutting machine 50 and the inspection device 60. The conveying machine 70 conveys the table 10 between the stocker portion 30 and the inspection device 60. A configuration of the conveying machine 70 is not particularly limited as long as the conveying machine 70 can convey the table 10.

The conveying machine 70 moves along a passage 72. In the example shown in FIG. 1, the placement portion 20, the stocker portion 30, the shaping machine 40, two cutting machines 50, and the control unit 90 are provided at one side of the passage 72. The placement portion 20, the stocker portion 30, the shaping machine 40, the two cutting machines 50, and the control unit 90 are provided along the passage 72. Three cutting machines 50, the inspection device 60, and the dust collecting unit 80 are provided at the other side of the passage 72. The three cutting machines 50, the inspection device 60, and the dust collecting unit 80 are provided along the passage 72.

1.1.8. Dust Collecting Unit

The dust collecting unit 80 is a portion for collecting shavings of the shaped object OB generated by the cutting machine 50. Although not shown, for example, a suction unit for suctioning the shavings is provided in the vicinity of the cutting tool 52 of the cutting machine 50. The shavings suctioned by the suction unit are collected in the dust collecting unit 80.

1.1.9. Control Unit

The control unit 90 is implemented by, for example, a computer including a processor, a main storage device, and an input and output interface for inputting a signal from the outside and outputting a signal to the outside. The control unit 90 implements various functions by, for example, executing, by the processor, a program loaded into the main storage device. The control unit 90 controls the shaping machine 40, the cutting machine 50, the inspection device 60, and the conveying machine 70. The control unit 90 may be implemented by a combination of a plurality of circuits instead of a computer.

1.2. Operation

Figure 10:
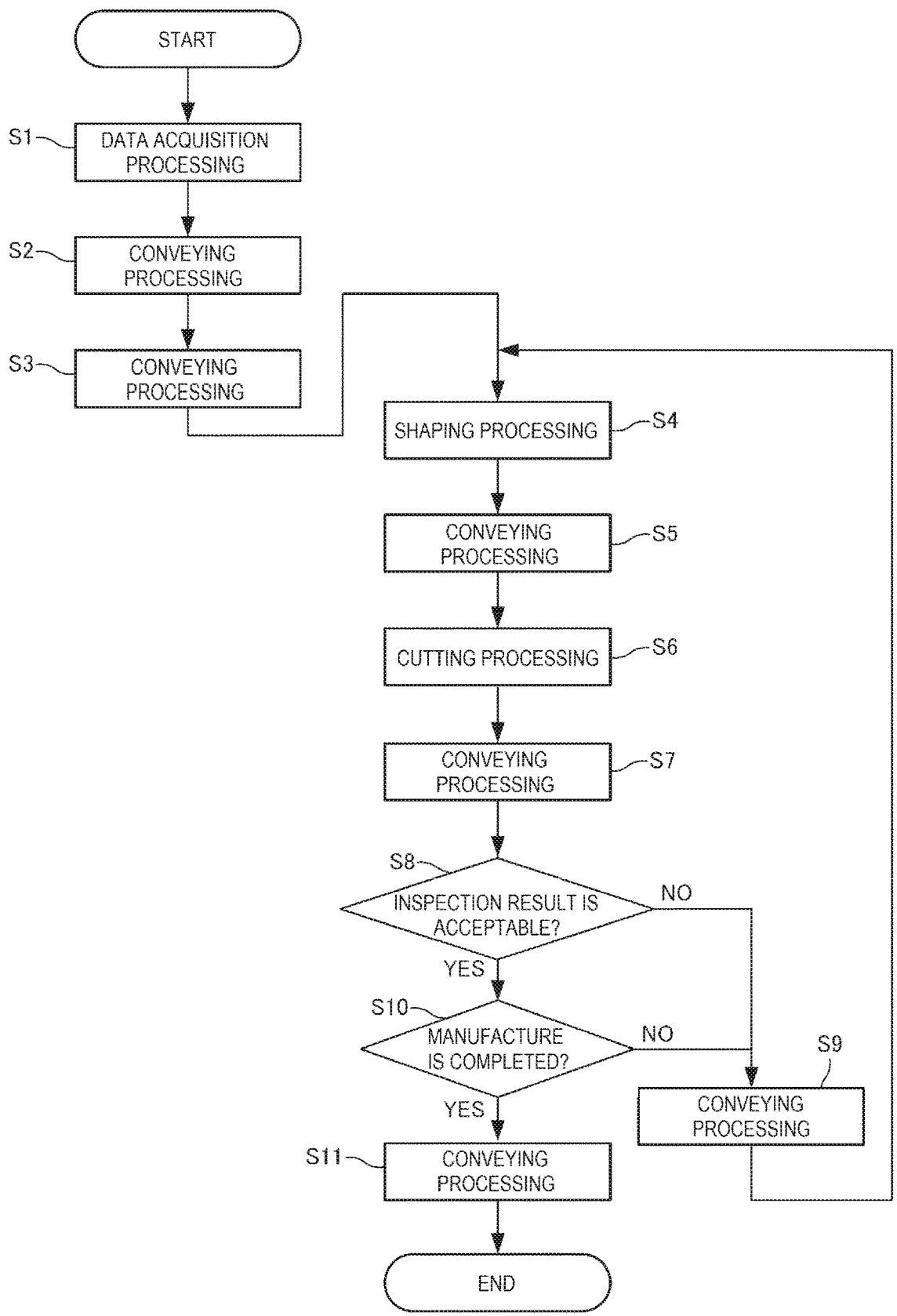
FIG. 10 is a flowchart showing an operation of the three-dimensional shaping system according to the present embodiment.

FIG. 10 is a flowchart showing an operation of the three-dimensional shaping system 100. Specifically, FIG. 10 is a flowchart showing processings of the control unit 90. When the control unit 90 receives a predetermined start operation, the control unit 90 starts processings for manufacturing the shaped object OB. Hereinafter, each processing of the control unit 90 will be described in order.

1.2.1. Step S1

First, as shown in FIG. 10, the control unit 90 performs a data acquisition processing of acquiring numerical control (NC) data for manufacturing the shaped object OB from a computer or a storage medium coupled to the three-dimensional shaping system 100.

The NC data is data indicating scanning trajectories of the shaping machine 40, the cutting machine 50, and the conveying machine 70. For example, the user creates data related to a shape of the shaped object OB and expressed in an STL format or an AMF format by using three-dimensional CAD software, and converts the data by using slicer software. Accordingly, the NC data is created.

1.2.2. Step S2

Next, the control unit 90 controls the conveying machine 70 to execute a conveying processing of conveying the table 10 placed in the placement portion 20 from the placement portion 20 to the stocker portion 30.

The stocker portion 30 includes a plurality of mounting portions on which the table 10 can be mounted. The stocker portion 30 includes a sensor. The control unit 90 causes the table 10 to be conveyed to an available mounting portion based on a detection signal of the sensor.

1.2.3. Step S3

Next, the control unit 90 controls the conveying machine 70 to execute a conveying processing of conveying the table 10 from the stocker portion 30 to the shaping machine 40.

Specifically, as shown in FIG. 5, the control unit 90 controls the conveying machine 70 to convey the table 10 from the stocker portion 30 to the shaping machine 40 so that the positioning mechanism 18 of the table 10 and the positioning mechanism 174 of the shaping machine 40 engage with each other. When the positioning mechanism 18 and the positioning mechanism 174 engage with each other, the movable portion 176 is moved to drive the heating unit 178 built in the base portion 172. Accordingly, the table 10 is heated.

The shaping machine 40 includes a sensor (not shown). The sensor transmits a signal to the control unit 90 when the shaping machine 40 is executing a processing (when shaping the shaped object on another table). When the control unit 90 receives the signal from the sensor, the conveying processing in step S3 is not executed.

The control unit 90 does not execute the conveying processing in step S2 when the signal from the sensor of the shaping machine 40 is not received and it is determined that another table is not mounted in the stocker portion 30 when the processing in step S1 is executed. In this case, the control unit 90 controls the conveying machine 70 to directly convey the table 10 placed in the placement portion 20 to the shaping machine 40.

1.2.4. Step S4

Next, as shown in FIG. 10, the control unit 90 controls the shaping machine 40 to execute a shaping processing of shaping the shaped object OB.

In the shaping processing, for example, the control unit 90 controls rotation of the flat screw 130 and a temperature of the heater 148 built in the barrel 140 to execute a material generating processing of generating a shaping material by melting a material.

As shown in FIGS. 5 and 6, by the material generating processing, the material accommodated in the material supply unit 110 is supplied from the side surface 133 of the flat screw 130 that is being rotated to the material introduction portion 138 via the supply path 112. The material supplied to the material introduction portion 138 is conveyed to the vortex portion 137 by the rotation of the flat screw 130. By the rotation of the flat screw 130 and heating by the heater 148, the material conveyed to the vortex portion 137 is melted to generate a paste shaping material having flowability. The generated shaping material is conveyed toward the central portion 136 through the vortex portion 137, and is supplied from the communication hole 146 to the nozzle 152. The shaping material is continuously generated when a discharge processing to be described later is executed.

The control unit 90 may execute the material generating processing before the conveying processing in step S3, or may simultaneously execute the conveying processing in step S3 and the material generating processing. Since the conveying processing in step S3 and the material generating processing are executed simultaneously, time required for manufacturing the shaped object OB can be shortened.

Further, in the shaping processing, the control unit 90 controls the re-heating unit 160 of the shaping machine 40 to execute a heating processing of heating the shaped object OB. The heating processing is executed, for example, when the control unit 90 determines that the shaped object OB is already shaped on the table 10 before the discharge processing to be described later is executed.

Specifically, the control unit 90 controls the re-heating unit 160 to heat the shaped object OB for a predetermined period of time. Heating time is set according to a type of a material, a temperature of the re-heating unit 160, and the like. For example, the control unit 90 sets the heating time using a map indicating a relationship between a temperature of the re-heating unit 160 and the heating time. The map can be set by checking time up to when a temperature of the shaped object OB reaches a predetermined temperature exceeding a glass transition point of the shaping material by an experiment performed in advance. Instead of the map, the control unit 90 may set the heating time using a function indicating a relationship between a temperature of the re-heating unit 160 and the heating time.

When the control unit 90 determines that a size of the shaped object OB is equal to or larger than a predetermined size based on the NC data, the control unit 90 may execute the heating processing even when the shaped object OB is not entirely shaped on the table 10.

Further, in the shaping processing, the control unit 90 executes a discharge processing of discharging the shaping material from the nozzle 152 toward the table 10 while changing the relative position between the nozzle 152 of the shaping machine 40 and the mounting portion 170 according to the NC data acquired in the data acquisition processing. Accordingly, the shaped object OB can be shaped on the table 10 by the shaping machine 40.

1.2.5. Step S5

Next, the control unit 90 controls the conveying machine 70 to execute a conveying processing of conveying the table 10 from the shaping machine 40 to the cutting machine 50.

Specifically, as shown in FIG. 9, the control unit 90 controls the conveying machine 70 to convey the table 10 from the shaping machine 40 to the cutting machine 50 so that the positioning mechanism 18 of the table 10 and the positioning mechanism 55 of the cutting machine 50 engage with each other.

In the example shown in FIG. 1, a plurality of cutting machines 50 are provided. Each of the plurality of cutting machines 50 includes a sensor (not shown). The sensor transmits a signal to the control unit 90 when the cutting machine 50 is executing a processing (when cutting a shaped object on another table). The control unit 90 causes the table 10 to be conveyed to a cutting machine 50 whose sensor is not transmitting the signal.

When signals from sensors of all of the cutting machines 50 are received, the control unit 90 controls the conveying machine 70 to convey the table 10 from the shaping machine 40 to the stocker portion 30. Then, when transmission of the signal from a sensor of a cutting machine 50 is stopped, the control unit 90 causes the table 10 to be conveyed from the stocker portion 30 to the cutting machine 50 (for example, the first cutting machine 50a) whose sensor stopped the transmission of the signal.

1.2.6. Step S6

Next, as shown in FIG. 10, the control unit 90 controls the cutting machine 50 to execute a cutting processing of cutting the shaped object OB.

Specifically, the control unit 90 brings the cutting tool 52 that is being rotated to come into contact with a cutting margin of the shaped object OB while changing a relative position between the cutting tool 52 of the cutting machine 50 and the mounting portion 53 according to the NC data acquired in the data acquisition processing. Accordingly, the shaped object OB on the table 10 can be cut to a desired size by the cutting machine 50.

1.2.7. Step S7

Next, the control unit 90 controls the conveying machine 70 to execute a conveying processing of conveying the table 10 from the cutting machine 50 to the inspection device 60.

1.2.8. Step S8

Next, the control unit 90 determines whether an inspection result of the shaped object OB executed by the inspection device 60 is "acceptable".

The inspection device 60 generates STL data (hereinafter, also referred to as "inspection data") based on the shaped object OB, and compares the inspection data with data related to a shape of the shaped object OB included in the NC data acquired in the data acquisition processing (hereinafter, also referred to as "reference data"). Then, the inspection device 60 transmits data related to a difference between the inspection data and the reference data to the control unit 90 as an inspection result.

When the difference between the inspection data and the reference data is within a predetermined range, the control unit 90 determines that the inspection result is "acceptable" ("YES" in step S8). Then, the processing proceeds to step S10.

On the other hand, when the difference between the inspection data and the reference data is outside the predetermined range, the control unit 90 determines that the inspection result is "not acceptable" ("NO" in step S8). In this case, the control unit 90 corrects the NC data so that the difference between the inspection data and the reference data is within the predetermined range. Then, the processing proceeds to step S9.

1.2.9. Step S9

Next, the control unit 90 controls the conveying machine 70 to execute a conveying processing of conveying the table 10 from the inspection device 60 to the shaping machine 40.

Thereafter, the control unit 90 returns the processing to step S4, and the control unit 90 repeats processings from steps S4 to S9 until the inspection result is determined as "acceptable" in step S8. For example, adhesion between the shaped object OB shaped by a first shaping processing and the shaping material discharged in a second shaping processing can be improved by the heating processing in the shaping processing in step S4.

For example, when it is "NO" in step S8 and it is determined that a shape based on the inspection data is larger than a shape based on the reference data, the control unit 90 may execute the cutting processing without executing the shaping processing. Specifically, the control unit 90 may omit processings in step 9 and steps S4 and S5, and execute step S6 after the control unit 90 controls the conveying machine 70 to convey the table 10 from the inspection device 60 to the cutting machine 50.

1.2.10 Step S10

Next, the control unit 90 determines whether manufacture of the shaped object OB is completed.

Completion of the manufacture of the shaped object OB refers to completion of cutting of the shaped object OB after completion of shaping of the shaped object OB in accordance with the NC data acquired in the data acquisition processing.

For example, when a length of the shaped object OB in the Z axis direction is larger than a length of the cutting tool 52 in the Z axis direction, when the shaped object OB is shaped by discharging the shaping material once, the cutting tool 52 does not reach the entire region and the cutting margin remains. Therefore, the shaped object OB is divided into a plurality of portions, and the shaping processing and the cutting processing are executed for each portion. In step S10, it is determined whether the shaping processing and the cutting processing are completed for all of the portions using the NC data.

When it is determined that the manufacture of the shaped object OB is completed ("YES" in step S10), the processing proceeds to step S11.

When it is determined that the manufacture of the shaped object OB is not completed ("NO" in step S10), the control unit 90 returns the processing to step S9. Then, the control unit 90 repeats processings from steps S4 to S10 until it is determined that the manufacture of the shaped object OB is completed in step S10. That is, the control unit 90 executes a processing by repeating the shaping processing, the conveying processing, and the cutting processing in this order.

1.2.11. Step S11

Next, the control unit 90 controls the conveying machine 70 to execute a conveying processing of conveying the table 10 from the inspection device 60 to the stocker portion 30.

By the above steps, the shaped object OB is manufactured. The shaped object OB is a three-dimensional shaped object. Then, the control unit 90 ends the processing.

A portion embedded in the opening 16 of the table 10 remains on the manufactured shaped object OB. This portion may be removed by an external device of the three-dimensional shaping system 100, or may be removed by a device provided in the three-dimensional shaping system 100.

1.3. Effect

The three-dimensional shaping system 100 includes the table 10 provided with the first positioning mechanism 18a, the shaping machine 40 that shapes the shaped object OB on the table 10, the cutting machine 50a that is provided with the first mounting portion 53 having the second positioning mechanism 55a and cuts the shaped object OB on the table 10, the conveying machine 70 that conveys the table 10 between the shaping machine 40 and the cutting machine 50a, and the control unit 90 that controls the shaping machine 40, the cutting machine 50a, and the conveying machine 70. The control unit 90 controls the shaping machine 40 to execute a first shaping processing (step S4) of shaping the shaped object OB, controls the conveying machine 70 to execute a conveying processing (step S5) of conveying the table 10 from the shaping machine 40 to the cutting machine 50a so that the first positioning mechanism 18a and the second positioning mechanism 55a engage with each other, and controls the cutting machine 50a to execute a first cutting processing (step S6) of cutting the shaped object OB.

Therefore, in the three-dimensional shaping system 100, the table 10 can be accurately disposed at a predetermined position of the cutting machine 50a by the conveying machine 70 compared with a case where the table and the cutting machine are not provided with the positioning mechanism. Accordingly, in the three-dimensional shaping system 100, the shaped object OB on the table 10 can be accurately cut, and quality of the shaped object OB can be improved. Further, the table 10 can be automatically conveyed by the conveying machine 70, and time required for manufacturing the shaped object OB can be shortened.

In the three-dimensional shaping system 100, the table 10 is provided with the third positioning mechanism 18b, and the first mounting portion 53 is provided with the fourth positioning mechanism 55b that engages with the third positioning mechanism 18b. Therefore, in the three-dimensional shaping system 100, the table 10 can be more accurately disposed at a predetermined position of the cutting machine 50a by the conveying machine 70.

In the three-dimensional shaping system 100, the shaping machine 40 includes the second mounting portion 170 provided with the fifth positioning mechanism 174 that engages with the first positioning mechanism 18a. Therefore, in the three-dimensional shaping system 100, the table 10 can be accurately disposed at a predetermined position of the shaping machine 40 compared with a case where the table and the shaping machine are not provided with the positioning mechanism.

In the three-dimensional shaping system 100, the mounting portion 170 is provided with the heating unit 178 that is driven when the first positioning mechanism 18a and the fifth positioning mechanism 174 engage with each other. Therefore, in the three-dimensional shaping system 100, for example, the table 10 can be fused to the mounting portion 170 by heat of the heating unit 178.

In the three-dimensional shaping system 100, the control unit 90 executes a processing by repeating the first shaping processing (step S4), the conveying processing (step S5), and the first cutting processing (step S6) in this order. For example, when a length of the shaped object OB in the Z axis direction is larger than a length of the cutting tool 52 in the Z axis direction, when the shaped object OB is shaped by discharging the shaping material once, the cutting tool 52 does not reach the entire region and the cutting margin remains. In the three-dimensional shaping system 100, since the processings from step S4 to step S6 are repeated, the cutting margin does not remain even when the length of the shaped object OB in the Z axis direction is larger than the length of the cutting tool 52 in the Z axis direction, and the shaped object OB can be cut to have a desired shape by the cutting tool 52.

The three-dimensional shaping system 100 includes the inspection device 60 that inspects the shaped object OB cut by the cutting machine 50a. Therefore, in the three-dimensional shaping system 100, a shape of the shaped object OB can be brought close to a shape indicated by design data compared with a case where the inspection device is not provided.

Although the plurality of cutting machines 50 may have the same cutting accuracy with one another, among the plurality of the cutting machines 50, cutting accuracy of the first cutting machine 50a and cutting accuracy of the second cutting machine 50b may be different. For example, the second cutting machine 50b may have higher cutting accuracy than the first cutting machine 50a. In this case, the control unit 90 may control the second cutting machine 50b to execute a second cutting processing of cutting the shaped object OB after the first cutting processing (step S6) of cutting the shaped object OB by the first cutting machine 50a. When such processings are executed, time required for cutting the shaped object OB by the first cutting machine 50a can be shortened and the shaped object OB can be cut with high accuracy by the second cutting machine 50b. Accordingly, time required for manufacturing the shaped object OB can be shortened and quality of the shaped object OB can be improved.

2. MODIFICATION

2.1. First Modification

Figure 11:
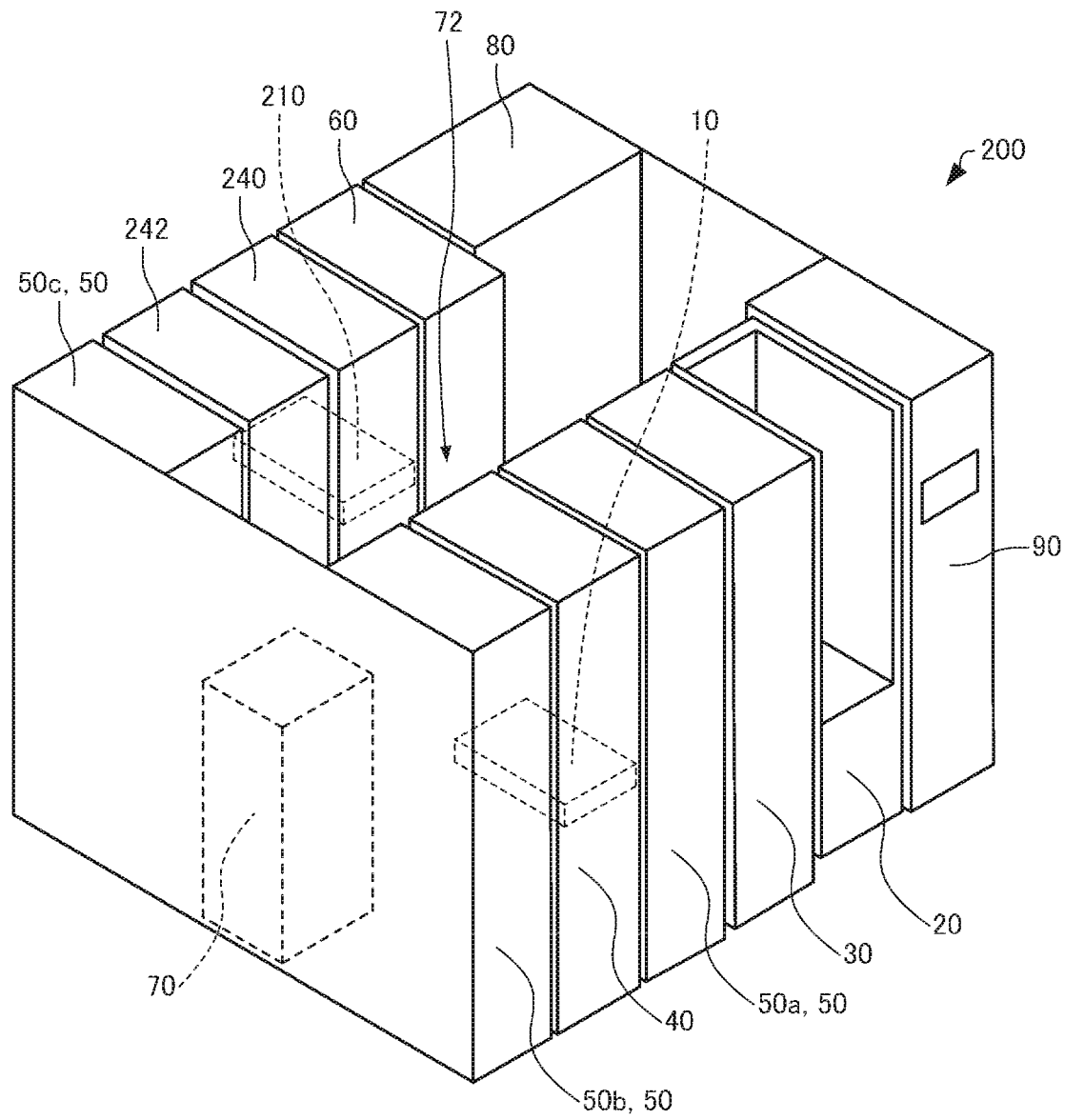
FIG. 11 is a perspective view schematically showing a three-dimensional shaping system according to a first modification of the present embodiment.

Next, a three-dimensional shaping system according to a first modification of the present embodiment will be described with reference to the drawings. FIG. 11 is a perspective view schematically showing a three-dimensional shaping system 200 according to the first modification of the present embodiment.

In the three-dimensional shaping system 200 according to the first modification of the present embodiment, components having the same functions as those of the three-dimensional shaping system 100 according to the present embodiment are denoted by the same reference numerals, and detailed description thereof will be omitted.

As shown in FIG. 1, the three-dimensional shaping system 100 described above includes one shaping machine (first shaping machine) 40 and five cutting machines 50.

In contrast, as shown in FIG. 11, the three-dimensional shaping system 200 includes a second shaping machine 240 and a third shaping machine 242 in addition to the first shaping machine 40. The second shaping machine 240 and the third shaping machine 242 basically have the same structure and the same function as the first shaping machine 40. The three-dimensional shaping system 200 includes three cutting machines 50 (the first cutting machine 50a, the second cutting machine 50b, and the third cutting machine 50c).

Further, the three-dimensional shaping system 200 includes a second table 210 in addition to the table (first table) 10. The second table 210 basically has the same structure and the same function as the first table 10. A second shaped object that is separate from the shaped object (first shaped object) OB disposed on the first table 10 is disposed on the second table 210.

The second shaping machine 240 shapes the second shaped object on the second table 210. The control unit 90 controls the second shaping machine 240 to execute a shaping processing of shaping the second shaped object. For example, the first shaping processing of shaping the first shaped object OB by the first shaping machine 40 and the second shaping processing of shaping the second shaped object by the second shaping machine 240 are executed simultaneously. Accordingly, the first shaped object OB and the second shaped object can be efficiently manufactured.

The number of tables provided in the three-dimensional shaping system 200 is not particularly limited as long as the tables can be stored in the stocker portion 30. The number of the shaping machines and the number of the cutting machines provided in the three-dimensional shaping system 200 are appropriately determined in consideration of a size of the three-dimensional shaping system 200, productivity based on processing speeds of the shaping machine and the cutting machine, and the like.

2.2. Second Modification

Next, a three-dimensional shaping system according to a second modification of the present embodiment will be described. The three-dimensional shaping system according to the second modification of the present embodiment is different from the three-dimensional shaping system 100 described above in that the three-dimensional shaping system according to the second modification of the present embodiment includes at least one of a polishing device that polishes the shaped object OB cut by the cutting machine 50, a surface processing device that performs a surface processing on the shaped object OB cut by the cutting machine 50, and a sintering furnace that sinters the shaped object OB cut by the cutting machine 50. The three-dimensional shaping system according to the second modification of the present embodiment may include these devices instead of the inspection device 60, or may include the inspection device 60 and these devices.

Examples of the surface processing performed by the surface processing device include plating and painting. Further, the three-dimensional shaping system according to the second modification of the present embodiment may include, for example, a device that dries the shaped object OB cut by the cutting machine 50.

As will be described in "2.3. Third Modification" later, the shaping material may contain a metal material or a ceramic material. In such a case, when the sintering furnace is provided, variations of the manufactured shaped object OB can be increased.

2.3. Third Modification

In the three-dimensional shaping system 100 described above, an ABS in a pellet form is used as the shaping material for shaping a three-dimensional shaped object. On the other hand, in a three-dimensional shaping system according to a third modification of the present embodiment, examples of the material used in the shaping machine 40 include various materials as a main material, such as a thermoplastic material other than ABS, a metal material, and a ceramic material. Here, the "main material" refers to a material serving as a center component for forming a shape of the three-dimensional shaped object, and refers to a material having a content of 50 wt % or more in the three-dimensional shaped object. The above-described shaping material includes a material obtained by melting the main material alone or a material obtained by melting the main material and a part of components contained in the main material into a paste form.

When the thermoplastic material is used as the main material, the shaping material is generated by plasticizing the material in the melting unit 120. The term. "plasticizing" refers to that the thermoplastic material is softened and exhibits flowability by being heated to a temperature equal to or higher than a glass transition point.

Examples of the thermoplastic material may include a thermoplastic resin. Examples of the thermoplastic resin include general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyetheretherketone (PEEK).

Additives such as a pigment, a metal, a ceramic, a wax, a flame retardant, an antioxidant, and a heat stabilizer may be mixed into the thermoplastic material. In the melting unit 120, the thermoplastic material is converted into a melted state by being plasticized by the rotation of the flat screw 130 and the heating of the heater 148. After the shaping material formed in such a manner is discharged from the nozzle hole 156, the shaping material is cured due to a reduction in a temperature.

It is desirable that the thermoplastic material is ejected from the nozzle hole 156 in a state of being melted completely by being heated to a temperature equal to or higher than a glass transition point of the thermoplastic material. For example, a glass transition point of the ABS is about 120° C., and it is desirable that the ABS is ejected from the nozzle hole 156 at about 200° C. In order to eject the shaping material in such a high-temperature state, a heater may be provided around the nozzle hole 156. The term "melt" not only refers to that the thermoplastic material is heated to a temperature equal to or higher than a melting point and becomes a liquid, but also refers to that the thermoplastic material is plasticized.

In the shaping machine 40, for example, a metal material may be used as the main material instead of the above-described thermoplastic material. In this case, it is desirable that a component to be melted at the time of generating the shaping material is mixed into a powder material obtained by converting the metal material into a powder, and then the mixture is charged into the melting unit 120.

Examples of the metal material include a single metal of magnesium (Mg), iron (Fe), cobalt (Co) or chromium (Cr), aluminum (Al), titanium (Ti), copper (Cu), nickel (Ni), or an alloy containing one or more these metals, or maraging steel, stainless steel, cobalt chromium molybdenum, a titanium alloy, a nickel alloy, an aluminum alloy, a cobalt alloy, and a cobalt chromium alloy.

In the shaping machine 40, a ceramic material may be used as the main material instead of the above-described metal material. Examples of the ceramic material include an oxide ceramic such as silicon dioxide, titanium dioxide, aluminum oxide, and zirconium oxide, and a non-oxide ceramic such as aluminum nitride. When the above-described metal material or ceramic material is used as the main material, the shaping material disposed on the mounting portion 170 may be cured by, for example, irradiating with a laser or sintering with hot air or the like.

A powder material of the metal material or the ceramic material that is charged into the material supply unit 110 may be a mixed material obtained by mixing a plurality of types of powders of a single metal or an alloy and powders of a ceramic material. The powder material of the metal material or the ceramic material may be coated with, for example, the above-described thermoplastic resin or a thermoplastic resin other than the above-described thermoplastic resin. In this case, the thermoplastic resin may be melted to exhibit flowability in the melting unit 120.

For example, a solvent may be added to the powder material of the metal material or the ceramic material charged into the material supply unit 110. Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, isopropyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (such as tetrabutylammonium acetate); and ionic liquids such as butyl carbitol acetate.

In addition, for example, a binder may be added to the powder material of the metal material or the ceramic material charged into the material supply unit 110. Examples of the binder include an acrylic resin, an epoxy resin, a silicone resin, a cellulose-based resin or other synthetic resins or polylactic acid (PLA), polyamide (PA), polyphenylene sulfide (PPS), polyetheretherketone (PEEK) or other thermoplastic resins.

The embodiment and the modifications described above are merely examples, and the present disclosure is not limited thereto. For example, the embodiment and the modifications can be combined as appropriate.

The present disclosure includes a configuration substantially the same as the configuration described in the embodiment such as a configuration having the same function, method, and result and a configuration having the same object and effect. The present disclosure includes a configuration in which a non-essential portion of the configuration described in the embodiment is replaced. In addition, the present disclosure includes a configuration having the same effect as the configuration described in the embodiment, or a configuration capable of achieving the same object. The present disclosure includes a configuration in which a known technique is added to the configuration described in the embodiment.

The following contents are derived from the embodiment and the modifications described above.

According to one aspect of the disclosure, a three-dimensional shaping system includes a first table provided with a first positioning mechanism, a first shaping machine configured to shape a first shaped object on the first table, a first cutting machine provided with a first mounting portion having a second positioning mechanism and configured to cut the first shaped object on the first table, a conveying machine configured to convey the first table between the first shaping machine and the first cutting machine, and a control unit configured to control the first shaping machine, the first cutting machine, and the conveying machine. The control unit is configured to control the first shaping machine to execute a first shaping processing of shaping the first shaped object, control the conveying machine to execute a conveying processing of conveying the first table from the first shaping machine to the first cutting machine so that the first positioning mechanism and the second positioning mechanism engage with each other, and control the first cutting machine to execute a first cutting processing of cutting the first shaped object.

According to the three-dimensional shaping system, the first table can be accurately disposed at a predetermined position of the first cutting machine by the conveying machine compared with a case where the table and the cutting machine are not provided with the positioning mechanism. Accordingly, the first shaped object on the first table can be accurately cut, and quality of the first shaped object can be improved.

According to the three-dimensional shaping system in the aspect, the first table may be provided with a third positioning mechanism, and the first mounting portion may be provided with a fourth positioning mechanism to be engaged with the third positioning mechanism.

According to the three-dimensional shaping system, the first table can be more accurately disposed at a predetermined position of the first cutting machine by the conveying machine.

According to the three-dimensional shaping system in the aspect, the first shaping machine may be provided with a second mounting portion having a fifth positioning mechanism to be engaged with the first positioning mechanism.

According to the three-dimensional shaping system, the first table can be accurately disposed at a predetermined position of the first shaping machine compared with a case where the table and the shaping machine are not provided with the positioning mechanism.

According to the three-dimensional shaping system in the aspect, the second mounting portion may be provided with a heating unit to be driven when the first positioning mechanism and the fifth positioning mechanism engage with each other.

According to the three-dimensional shaping system, for example, the first table can be fused to the second mounting portion by heat of the heating unit.

According to the three-dimensional shaping system in the aspect, the control unit may execute a processing of repeating the first shaping processing, the conveying processing, and the first cutting processing in this order.

According to the three-dimensional shaping system, a cutting margin does not remain even when a length of the shaped object in the Z axis direction is larger than a length of a cutting tool of the shaping machine in the Z axis direction, and the shaped object can be cut to have a desired shape by the cutting tool.

The three-dimensional shaping system according to the aspect may further include a second table and a second shaping machine configured to shape a second shaped object on the second table. The control unit may control the second shaping machine to execute a second shaping processing of shaping the second shaped object, and the first shaping processing and the second shaping processing may be simultaneously executed.

According to the three-dimensional shaping system, the first shaped object and the second shaped object can be efficiently manufactured.

The three-dimensional shaping system according to the aspect may further include a second cutting machine having cutting accuracy higher than that of the first cutting machine and configured to cut the first shaped object on the first table. The control unit may control the second cutting machine to execute a second cutting processing of cutting the first shaped object after the first cutting processing.

According to the three-dimensional shaping system, time required for manufacturing the first shaped object can be shortened and quality of the first shaped object can be improved.

The three-dimensional shaping system according to the aspect may further include at least one of an inspection device configured to inspect the first shaped object cut by the first cutting machine, a polishing device configured to polish the first shaped object cut by the first cutting machine, a surface processing device configured to perform a surface processing on the first shaped object cut by the first cutting machine, and a sintering furnace configured to sinter the first shaped object cut by the first cutting machine.

According to the three-dimensional shaping system, variations of the manufactured first shaped object can be increased.

According to another aspect, a three-dimensional shaped object manufacturing method includes shaping a shaped object on a table provided with a first positioning mechanism by a shaping machine, conveying the table from the shaping machine to a cutting machine provided with a mounting portion having a second positioning mechanism so that the first positioning mechanism and the second positioning mechanism engage with each other, and cutting the shaped object on the conveyed table by the cutting machine.

According to the three-dimensional shaped object manufacturing method, the table can be accurately disposed at a predetermined position of the cutting machine by the conveying machine compared with a case where the table and the cutting machine are not provided with the positioning mechanism. Accordingly, the shaped object on the table can be accurately cut, and quality of the shaped object can be improved.

What is claimed is:

1. A three-dimensional shaped object manufacturing method comprising:
shaping a first shaped object on a first table provided with a first positioning mechanism by a first shaping machine;
conveying the first table from the first shaping machine to a first cutting machine provided with a first mounting portion having a second positioning mechanism so that the first positioning mechanism and the second positioning mechanism engage with each other; and
cutting the first shaped object on the conveyed first table by the first cutting machine.

2. The three-dimensional shaped object manufacturing method according to claim 1, wherein
the first table is provided with a third positioning mechanism, and
the first mounting portion is provided with a fourth positioning mechanism to be engaged with the third positioning mechanism.

3. The three-dimensional shaped object manufacturing method according to claim 1, wherein the first shaping machine is provided with a second mounting portion having a fifth positioning mechanism to be engaged with the first positioning mechanism.

4. The three-dimensional shaped object manufacturing method according to claim 3, wherein the second mounting portion is provided with a heating unit that is configured to be on so as to heat when the first positioning mechanism and the fifth positioning mechanism engage with each other.

5. The three-dimensional shaped object manufacturing method according to claim 1, further comprising repeating acts of (1) shaping the shaped object, (2) conveying the table from the shaping machine to the first cutting machine, and (3) cutting the shaped object on the conveyed table by the first cutting machine in this order.

6. The three-dimensional shaped object manufacturing method according to claim 1, further comprising shaping a second shaped object on a second table by a second shaping machine, wherein shaping the first shaped object and the second shaped object are simultaneously executed.

7. The three-dimensional shaped object manufacturing method according to claim 1, further comprising cutting the first shaped object on the conveyed first table by a second cutting machine having a cutting accuracy higher than that of the first cutting machine, wherein cutting by the second cutting machine is executed after cutting by the first cutting machine.

8. The three-dimensional shaped object manufacturing method according to claim 1, further comprising:
inspecting the shaped object cut by the cutting machine; and
sintering the shaped object cut by the first cutting machine by a sintering furnace.

* * * * *